US010498945B2

United States Patent
Yamamoto

(10) Patent No.: US 10,498,945 B2
(45) Date of Patent: Dec. 3, 2019

(54) IMAGING-DEVICE COORDINATION APPARATUS, IMAGING-DEVICE COORDINATION PROGRAM, COORDINATION SUPPORT SYSTEM, AND CONTROL SYSTEM

(71) Applicant: Mitsubishi Electric Corporation, Tokyo (JP)

(72) Inventor: Yushi Yamamoto, Aichi (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/325,413

(22) PCT Filed: Oct. 31, 2016

(86) PCT No.: PCT/JP2016/082209
§ 371 (c)(1),
(2) Date: Feb. 14, 2019

(87) PCT Pub. No.: WO2018/078841
PCT Pub. Date: May 3, 2018

(65) Prior Publication Data
US 2019/0215427 A1    Jul. 11, 2019

(51) Int. Cl.
*H04N 5/232* (2006.01)
*G03B 15/16* (2006.01)
(Continued)

(52) U.S. Cl.
CPC ............ *H04N 5/232* (2013.01); *G03B 15/00* (2013.01); *G03B 15/16* (2013.01); *G03B 17/561* (2013.01);
(Continued)

(58) Field of Classification Search
CPC ........ H04N 5/232; H04N 5/225; G03B 15/00; G03B 17/561; G03B 15/16; G05B 19/418; Y02P 90/265; Y02P 90/02
See application file for complete search history.

(56) References Cited

U.S. PATENT DOCUMENTS

| | | | | |
|---|---|---|---|---|
| 4,506,978 A | * | 3/1985 | Allocco, Jr. ......... | G03B 27/625 271/3.01 |
| 10,040,193 B2 | * | 8/2018 | Kobayashi ............... | B25J 9/126 |

(Continued)

FOREIGN PATENT DOCUMENTS

| CN | 105308519 A | 2/2016 |
|---|---|---|
| JP | 64-065605 A | 3/1989 |

(Continued)

OTHER PUBLICATIONS

Office Action received for Taiwanese Patent Application No. 106136529 dated Nov. 30, 2018, 28 pages including English translation.

(Continued)

*Primary Examiner* — James M Pontius
(74) *Attorney, Agent, or Firm* — Xsensus LLP

(57) ABSTRACT

To provide automatic coordination control that causes a camera to capture an image at a predetermined time point during control of a control target device by a motion controller. A camera coordination apparatus includes a coordination condition memory to store a coordination condition specifying the motion controller and the camera to which the automatic coordination control is to be provided, and coordination control circuitry to provide control that causes the camera stored in the coordination condition memory to capture an image, on the basis of a control state of the control target device. The control state indicates a progress (Continued)

of an operation of the control target device caused by the motion controller stored in the coordination condition memory.

15 Claims, 7 Drawing Sheets

(51) Int. Cl.
*G03B 17/56* (2006.01)
*G05B 19/418* (2006.01)
*G03B 15/00* (2006.01)
*H04N 5/225* (2006.01)

(52) U.S. Cl.
CPC ........... *G05B 19/418* (2013.01); *H04N 5/225* (2013.01); *Y02P 90/02* (2015.11); *Y02P 90/265* (2015.11)

(56) References Cited

U.S. PATENT DOCUMENTS

| | | | |
|---|---|---|---|
| 2004/0094366 A1 | 5/2004 | Weinberger et al. | |
| 2013/0129394 A1* | 5/2013 | Shirakata | G03G 15/0189 399/301 |
| 2013/0217061 A1* | 8/2013 | Sato | G02B 21/367 435/29 |
| 2014/0005835 A1 | 1/2014 | Nishiyama et al. | |
| 2014/0204196 A1* | 7/2014 | Loney | G02B 7/38 348/80 |
| 2016/0124398 A1 | 5/2016 | Cheng et al. | |
| 2017/0085781 A1* | 3/2017 | Fu | H04N 5/232 |
| 2017/0226471 A1* | 8/2017 | Kato | C12M 1/00 |
| 2018/0054551 A1* | 2/2018 | Takahashi | H04N 5/232 |
| 2019/0191092 A1* | 6/2019 | Imanishi | G03B 5/00 |

FOREIGN PATENT DOCUMENTS

| | | |
|---|---|---|
| JP | 2005-148860 A | 6/2005 |
| JP | 2012-194662 A | 10/2012 |
| JP | 5755387 B1 | 7/2015 |
| JP | 2016-091501 A | 5/2016 |
| TW | I305192 B | 1/2009 |
| TW | I521385 B | 2/2016 |
| WO | 2015/181878 A1 | 12/2015 |

OTHER PUBLICATIONS

Office Action received for Japanese Patent Application No. 2017-561004 dated Dec. 28, 2017, 4 pages including English translation.
Decision to Grant received for Japanese Patent Application No. 2017-561004, dated Jun. 4, 2018, 6 pages including English translation.
International Search Report dated Jan. 10, 2017 for PCT/JP2016/082209 filed on Oct. 31, 2016, 7 pages including English Translation.

* cited by examiner

FIG.6

| No. | FLAG | SHAFT | COORDINATION CARRY-OUT CURRENT VALUE | CAMERA | FUNCTION POINTER |
|---|---|---|---|---|---|
| 1 | ON | SHAFT 1 | 10000 | FIRST CAMERA | Func1 |
| 2 | OFF | SHAFT 2 | 5000 | SECOND CAMERA | Func2 |

FIG.8

| No. 51 | FLAG 52 | SHAFT 53 | FIRST COORDINATION CARRY-OUT CURRENT VALUE 57 | SECOND COORDINATION CARRY-OUT CURRENT VALUE 58 | CAMERA 55 | FUNCTION POINTER 56 |
|---|---|---|---|---|---|---|
| 1 | ON | SHAFT 1 | 9000 | 10000 | FIRST CAMERA | Func1 |
| 2 | OFF | SHAFT 2 | 4000 | 5000 | SECOND CAMERA | Func2 |
| ... | | | | | | |

41b

– 1 –

IMAGING-DEVICE COORDINATION APPARATUS, IMAGING-DEVICE COORDINATION PROGRAM, COORDINATION SUPPORT SYSTEM, AND CONTROL SYSTEM

CROSS-REFERENCE TO RELATED APPLICATION

The present application is based on PCT filing PCT/JP2016/082209, filed Oct. 31, 2016, the contents of which are incorporated herein by reference.

FIELD

The present invention relates to an imaging-device coordination apparatus, an imaging-device coordination program, a coordination support system, and a control system that provide coordination between control of an operation of a control target device and control of image capturing by an imaging device.

BACKGROUND

A technology has been used in recent years in which a product is imaged by a camera, which is an imaging device, in a production system, and a captured image is used for observation or inspection of the product. Patent Literature 1 discloses a technology that uses a sensor for detecting a workpiece reaching a detection position, as a device for triggering an operation of a camera. That is, the technology of Patent Literature 1 activates the sensor when a target workpiece being fed by a part feed system reaches an inspection position, and causes the sensor to output an output signal to a central processing unit (CPU) of a programmable logic controller (PLC). Upon detection of the output signal output from the sensor, the CPU activates a positioning mechanism to position the workpiece at the inspection position, and then causes the camera to perform image autofocusing control and to capture an image of the workpiece.

CITATION LIST

Patent Literature

Patent Literature 1: Japanese Patent Application Laid-open No. 2005-148860

SUMMARY

Technical Problem

However, the foregoing technology of Patent Literature 1 uses a dedicated triggering element, i.e., a dedicated sensor, for activating the camera. This presents a problem in that it is necessary to provide a space to dispose this sensor near the part feed system in the production system and the configuration of the production system becomes more complexed.

The present invention has been made in view of the foregoing, and it is an object of the present invention to provide an imaging-device coordination apparatus that enables easy coordination between control of a control target device and control of image capturing by an imaging device by using a relatively simple configuration.

Solution to Problem

To solve the problem and achieve the object described above, an imaging-device coordination apparatus according to an aspect of the present invention provides automatic coordination control that causes an imaging device to capture an image at a predetermined time point during control of a control target device by a motion controller. The imaging-device coordination apparatus includes: a coordination condition storage unit to store a coordination condition specifying the motion controller and the imaging device to which the automatic coordination control is to be provided; and a coordination control unit to provide control that causes the imaging device stored in the coordination condition storage unit to capture an image, on a basis of a control state of the control target device, wherein the control state indicates a progress of an operation of the control target device caused by the motion controller stored in the coordination condition storage unit.

Advantageous Effects of Invention

An imaging-device coordination apparatus according to the present invention provides an advantage in that it is possible to provide easy coordination between control of a control target device and control of image capturing by an imaging device by using a relatively simple configuration.

BRIEF DESCRIPTION OF DRAWINGS

FIG. 6 is a diagram illustrating an example of a coordination condition table according to the embodiment of the present invention.

FIG. 8 is a diagram illustrating an example of another coordination condition table according to the embodiment of the present invention.

DESCRIPTION OF EMBODIMENTS

An imaging-device coordination apparatus, an imaging-device coordination program, a coordination support system, and a control system according to an embodiment of the present invention will be described in detail below with reference to the drawings. Note that the embodiment is not intended to limit the scope of this invention.

Embodiment

Figure 1:
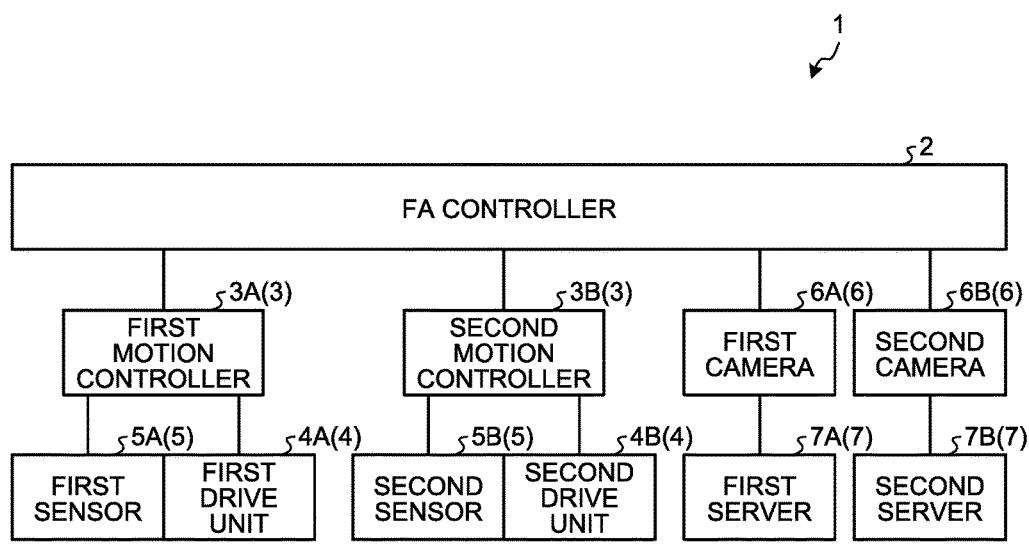
FIG. 1 is a diagram illustrating a factory automation system using a camera coordination apparatus according to an embodiment of the present invention.

FIG. 1 is a diagram illustrating a factory automation (FA) system 1 that uses a camera coordination apparatus, i.e., an imaging-device coordination apparatus, according to an embodiment of the present invention. The FA system 1 according to the present embodiment is a control system including a drive unit 4 that is a control target device; a factory automation (FA) controller 2 that is a control device that controls a motion controller 3 to, in turn, control the drive unit 4; the motion controller 3 that controls the drive unit 4 as controlled by the FA controller 2; a camera 6 that is an imaging device that captures an image of a product as controlled by the FA controller 2; and a server 7 that stores imaging data captured by the camera 6.

The drive unit 4 includes a sensor 5. The sensor 5 detects an operational state of the drive unit 4. Examples of the operational state detected by the sensor 5 include a temperature, a speed, and a position. In the present embodiment, the operational state detected by the sensor 5 indicates the progress of an operation of the drive unit 4 with respect to the movement during the overall operation of the drive unit 4 caused by a program for controlling an operation of the drive unit 4 by the motion controller 3. That is, for example, when the moving portion of the drive unit 4 moves from point A to point D along a route in the order from point A, to point B, to point C, and to point D, the sensor 5 is used to identify the position of the moving portion on the route from point A to point D. The drive unit 4 supplies power to a shaft in the production system. The drive unit 4 may be a device such as a motor or an actuator. The shaft mentioned above is a shaft of a device in the production system. The FA system 1 includes a first drive unit 4A and a second drive unit 4B each as the drive unit 4. The first drive unit 4A includes a first sensor 5A as the sensor 5. The second drive unit 4B includes a second sensor 5B also as the sensor 5. The FA system 1 may include more drive units 4 and sensors 5 than those illustrated.

Figure 2:
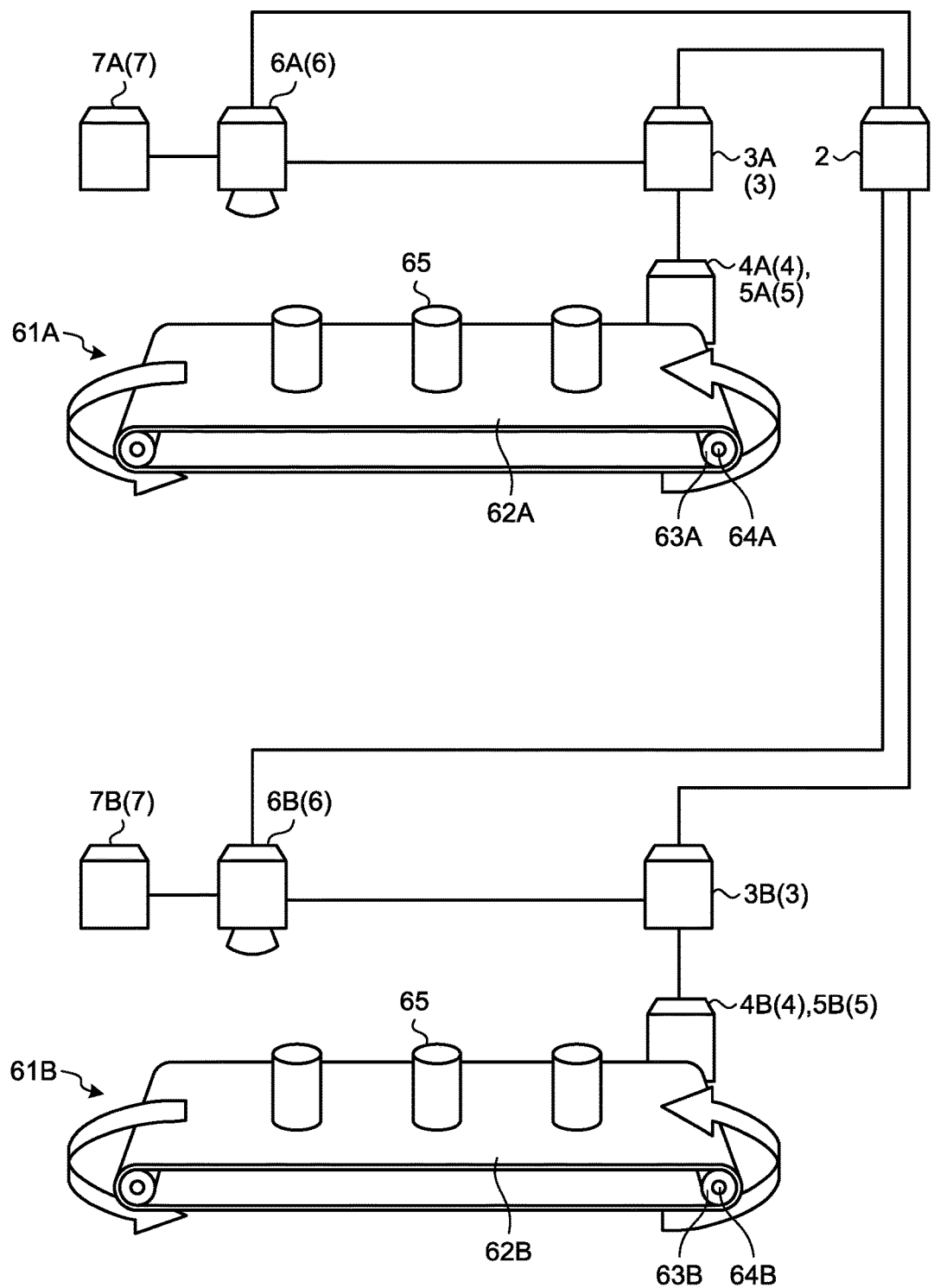
FIG. 2 is a schematic diagram illustrating an example of a factory automation (FA) system including a drive unit that drives a belt conveyor in the embodiment of the present invention.

FIG. 2 is a schematic diagram illustrating an example of an FA system that includes a drive unit that drives a belt conveyor in the embodiment of the present invention. The present embodiment assumes that a motor serving as the drive unit 4 drives a belt conveyor to feed a product 65. As illustrated in FIG. 2, the first drive unit 4A drives a first belt conveyor 61A. The first belt conveyor 61A includes a first endless conveyor belt 62A; a first roller 63A having a first roller shaft 64A; and a motor serving as the first drive unit 4A. The first belt conveyor 61A drives the first roller shaft 64A to rotate using the motor, and thus circulates the first conveyor belt 62A using the first roller 63A to convey the product 65 on the first conveyor belt 62A. In the first belt conveyor 61A, the first roller shaft 64A corresponds to the shaft described above.

The second drive unit 4B drives a second belt conveyor 61B. The second belt conveyor 61B includes a second endless conveyor belt 62B; a second roller 63B having a second roller shaft 64B; and a motor serving as the second drive unit 4B. The second belt conveyor 61B drives the second roller shaft 64B to rotate using the motor, and thus circulates the second conveyor belt 62B using the second roller 63B to convey the product 65 on the second conveyor belt 62B. In the second belt conveyor 61B, the second roller shaft 64B corresponds to the shaft described above.

Note that, in a practical use situation, a belt conveyor for placing the product 65 onto the first belt conveyor 61A and a belt conveyor for transferring the product 65 from the first belt conveyor 61A are provided next to the first belt conveyor 61A. However, these belt conveyors are omitted. Similarly, in a practical use situation, a belt conveyor for placing the product 65 onto the second belt conveyor 61B and a belt conveyor for transferring the product 65 from the second belt conveyor 61B are provided next to the second belt conveyor 61B. However, these belt conveyors are omitted.

The FA controller 2 controls the drive unit 4 and controls image capturing of a product performed by the camera 6. In addition, the FA controller 2 generates, upon reception of input information from the sensor 5, a drive command for the drive unit 4 using this information. The FA controller 2 sends the generated drive command to the drive unit 4. Note that the FA controller 2 operates based on a control program 14 described later herein. The FA controller 2 may be a PLC.

The motion controller 3 generates a drive command for controlling the drive unit 4 on the basis of the command sent from the FA controller 2, and sends the drive command to the drive unit 4 to control the drive operation of the drive unit 4. The motion controller 3 controls the operation of the drive unit 4 specified by a user program stored in the motion controller 3. The motion controller 3 also sends actual current value information on the drive unit 4, i.e., a current machine feed value of the drive unit 4 sent from the sensor 5, to the FA controller 2. A machine feed value represents a drive position of the drive unit 4. Actual current value information on the drive unit 4 is information about the current drive position of the drive unit 4 being driven, in other words, control state information indicating a state of control provided to the drive unit 4 by the motion controller 3. A control state indicates a progress of control of the operation of the drive unit 4 provided by the motion controller 3.

The FA system 1 includes a first motion controller 3A and a second motion controller 3B each as the motion controller 3. The first motion controller 3A controls the drive operation of the first drive unit 4A that drives the first belt conveyor 61A. The second motion controller 3B controls the drive operation of the second drive unit 4B that drives the second belt conveyor 61B.

The camera 6 is disposed at a predetermined location that allows the camera 6 to capture an image of a product, around the belt conveyor driven by the motor serving as the drive unit 4 in the FA system 1. The camera 6 captures an image of the product that has reached a predetermined inspection position on the belt conveyor in response to the drive command sent from a camera control unit 46 described later herein, and sends the imaging data to the server 7 via wireless communication. The FA system 1 includes a first camera 6A and a second camera 6B each as the camera 6. The FA system 1 also includes a first server 7A and a second server 7B each as the server 7.

The first camera 6A is disposed at a predetermined location that allows the first camera 6A to capture an image of a product, around the first belt conveyor 61A driven by the motor serving as the first drive unit 4A in the FA system 1. The first camera 6A captures an image of the product that has reached a predetermined inspection position on the first belt conveyor 61A in response to the drive command sent from the camera control unit 46 described later herein, and sends the imaging data to the first server 7A via wireless communication.

The first server 7A associates the imaging data sent from the first camera 6A with the capture time, and stores the imaging data in a storage unit in the first server 7A.

The second camera 6B is disposed at a predetermined location that allows the second camera 6B to capture an image of a product, different from the position where the first camera 6A is disposed, around the second belt conveyor 61B driven by the motor serving as the second drive unit 4B in the FA system 1. The second camera 6B captures an image of the product that has reached a predetermined inspection position on the second belt conveyor 61B in response to the drive command sent from the camera control unit 46 described later herein, and sends the imaging data to the second server 7B via wireless communication. The communication between the first camera 6A and the first server 7A, and the communication between the second camera 6B and the second server 7B are not limited to wireless communication, but may also be wired communication.

The second server 7B associates the imaging data sent from the second camera 61B with the capture time, and stores the imaging data in a storage unit in the second server 71B.

Figure 3:
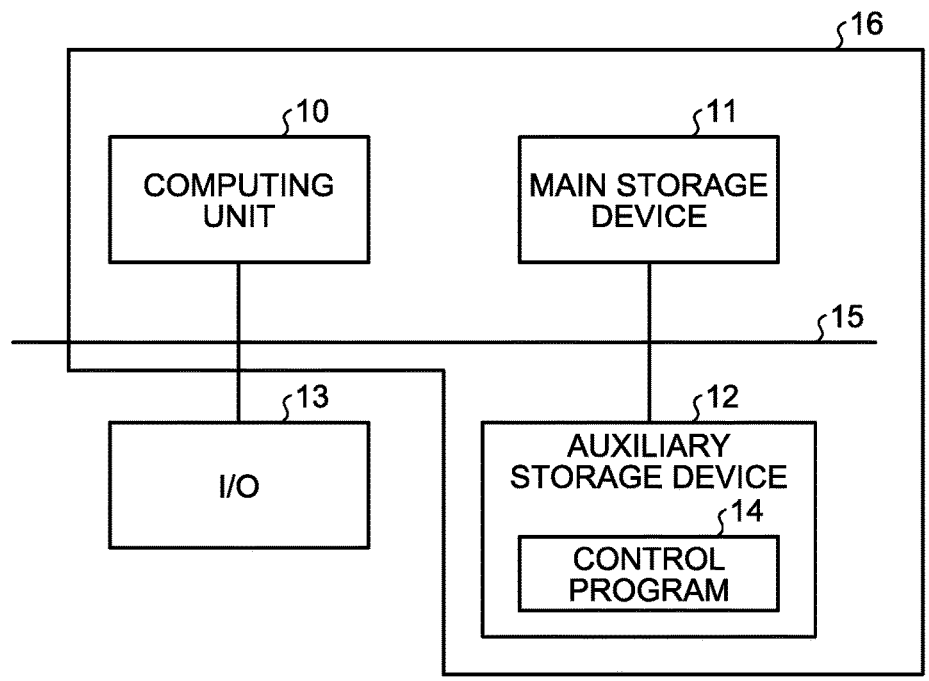
FIG. 3 is a diagram illustrating an example hardware configuration of a central-processing-unit (CPU) unit in the embodiment of the present invention.

FIG. 3 is a diagram illustrating an example hardware configuration of a central-processing-unit (CPU) unit in the FA controller 2 according to the embodiment of the present invention. The FA controller 2 is a computer including a computing unit 10, a main storage device 11, an auxiliary storage device 12, and an input-output (I/O) unit 13. The computing unit 10, the main storage device 11, the auxiliary storage device 12, and the I/O unit 13 are connected to a bus 15 to communicate with one another.

The computing unit 10, the main storage device 11, and the auxiliary storage device 12 together form a central-processing-unit (CPU) unit 16 that executes a system program, herein referred to as a first program, and a user program, herein referred to as a second program. The CPU unit 16 executes the system program at a higher priority than the user program.

The computing unit 10 can perform an operation based on a program. The computing unit 10 is a central processing unit (CPU), more specifically, a single core CPU.

The main storage device 11 is a memory used as a workspace of the computing unit 10. The main storage device 11 is configured from a memory having a faster access than the auxiliary storage device 12. The main storage device 11 is configured from a random access memory (RAM).

The auxiliary storage device 12 is used as a storage and a memory device for storing the control program 14. The auxiliary storage device 12 is configured from a read-only memory (ROM), a hard disk drive, a solid state drive (SSD), a removable memory device, or a combination thereof.

The I/O unit 13 is a connection interface for communication with the motion controllers 3, the first camera 6A, and the second camera 6B. The motion controllers 3, the first camera 6A, and the second camera 6B may communicate with the FA controller 2 using any connection standard.

The control program 14 includes a user program, an operating system (OS) program, and a system program. The control program 14 is read from the auxiliary storage device 12, and is loaded through the bus 15 to a workspace of the main storage device 11. The computing unit 10 creates multiple tasks on the basis of the program and the OS loaded to the workspace. That is, the computing unit 10 creates user tasks on the basis of the user program and the OS loaded to the workspace. The computing unit 10 also creates system tasks on the basis of the system program and the OS loaded to the workspace. The computing unit 10 switches the multiple tasks to perform each of the multiple tasks. The FA controller 2 provides control of the drive unit 4 through collaboration of multiple tasks. Within a task, a functional unit for providing the function of the task is created. Tasks and functional units can send and receive information thereto and therefrom.

The FA controller 2 may also include a display device such as a liquid crystal display (LCD), and an input device such as a keyboard to receive information.

A system task is a task for performing preset processing in the FA controller 2, and has a higher processing priority than a user task. That is, in a case in which a process of a system task and a process of a user task have been both enqueued, the computing unit 10 first performs the process of a system task having a higher priority.

A task is a unit of execution of a process from an OS perspective. A task is, in a practical sense, a program module contained in the control program 14, having one or more values that vary with control. These program modules are held in the workspace, and the computing unit 10 switches these program modules held in the workspace under task management of the OS to perform each of the program modules. The computing unit 10 performs only one task at a time.

Figure 4:
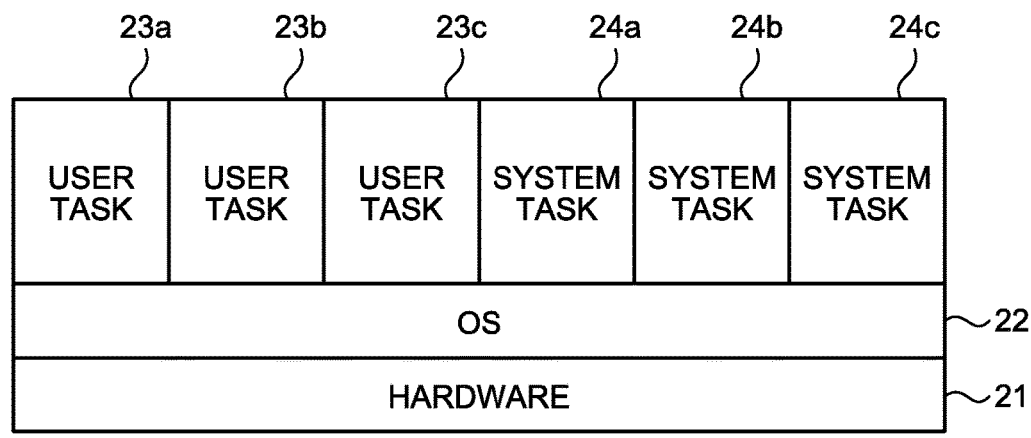
FIG. 4 is a diagram illustrating an example software configuration of an FA controller according to the embodiment of the present invention.

FIG. 4 is a diagram illustrating an example software configuration of the FA controller 2 according to the embodiment of the present invention. The multiple tasks are each performed under task management of an OS 22. FIG. 1 illustrates, by way of example, a user task 23a, a user task 23b, and a user task 23c as the user tasks, and a system task 24a, a system task 24b, and a system task 24c as the system tasks. The OS 22 intervenes between the tasks and hardware 21 to permit the tasks to use the hardware 21. The hardware 21 collectively refers to the computing unit 10, the main storage device 11, the auxiliary storage device 12, and the I/O unit 13.

Figure 5:
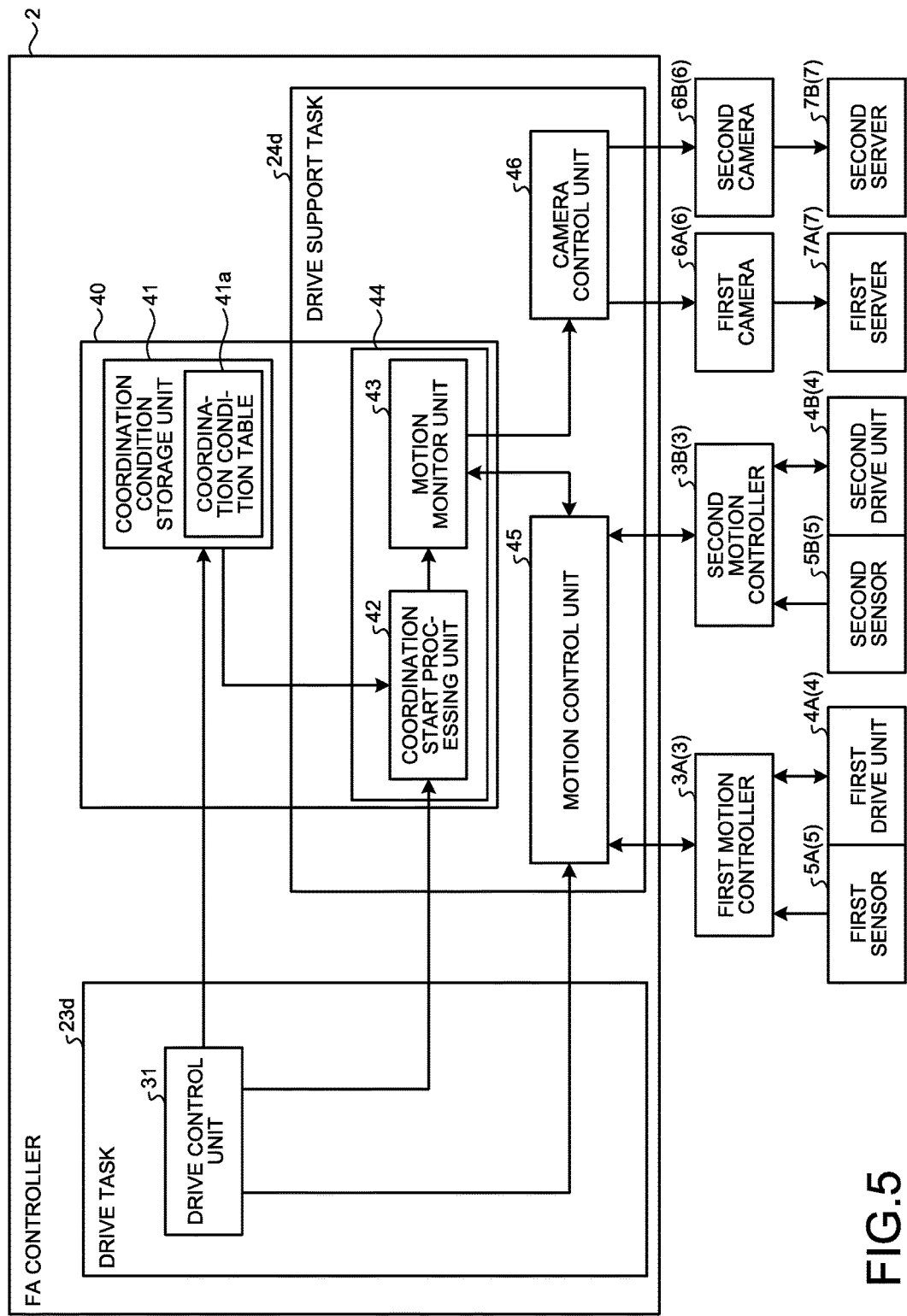
FIG. 5 is a functional block diagram for describing main functions of the FA controller for providing control of automatic coordination between drive control of a drive unit by a motion controller and control that causes a camera to capture an image, in the embodiment of the present invention.

FIG. 5 is a functional block diagram for describing main functions of the FA controller 2 for providing control of automatic coordination between drive control of the drive unit 4 by the motion controller 3 and control that causes the camera 6 to capture an image in the embodiment of the present invention. As used herein, control of automatic coordination between drive control of the drive unit 4 by the motion controller 3 and control that causes the camera 6 to capture an image means automatic control that causes the camera 6 to capture an image at a predetermined time point during control of the drive unit 4 by the motion controller 3. The phrase "control of automatic coordination between drive control of the drive unit 4 by the motion controller 3 and control that causes the camera 6 to capture an image" may also be hereinafter referred to as "automatic coordination control".

The FA controller 2 includes a drive control unit 31 in a drive task 23d, which is one of the user tasks. The drive task 23d provides control of driving of the drive unit 4. The drive control unit 31 is one of the multiple functional units included in the drive task 23d. The FA controller 2 also includes a coordination condition storage unit 41 that stores a coordination condition table 41a in which automatic coordination parameters, serving as coordination information for managing automatic coordination control, are set.

The drive control unit 31 registers, as described later, the automatic coordination parameters, including flag information, in the coordination condition table 41a before the control of the drive unit 4 is started. Then, at the beginning of the drive control of the drive unit 4, the drive control unit 31 sends, to a motion control unit 45, drive control start instruction information, which serves an instruction to start the drive control of the drive unit 4 by the motion controller 3. At the beginning of the automatic coordination control, the drive control unit 31 sends, to a coordination start processing unit 42, automatic coordination control start instruction information, which serves an instruction to start the automatic coordination control.

The FA controller 2 includes the coordination start processing unit 42, a motion monitor unit 43, the motion control unit 45, and the camera control unit 46 in a drive support task 24d, which is one of the system tasks. The drive support task 24d supports the drive control of the drive unit 4 provided by the motion controller 3 and provides the automatic coordination control. The drive support task 24d is performed as a system program having a higher priority than a user program, and more specifically, as firmware.

In the FA controller 2, the coordination condition storage unit 41, the coordination start processing unit 42, and the motion monitor unit 43 together form a camera coordination apparatus 40, which provides control of coordination between the drive control of the drive unit 4 by the motion controller 3 and the control that causes the camera 6 to capture an image. In particular, the coordination start processing unit 42 and the motion monitor unit 43 together form a coordination support system 44, which provides control of coordination between the drive control of the drive unit 4 by the motion controller 3 and the control that causes the camera 6 to capture an image. The coordination support system 44 is implemented by the CPU unit 16 by executing a coordination support program that is a system program describing a processing procedure described later. The coordination support system 44 serves as a coordination control unit in the camera coordination apparatus 40.

The coordination condition storage unit 41 stores the coordination condition table 41a in which automatic coordination parameters, serving as coordination information for managing automatic coordination control, are set. The automatic coordination parameters are set and registered in the coordination condition table 41a by the drive control unit 31 upon start-up of the FA controller 2. The coordination condition table 41a may contain multiple parameter sets, where each parameter set contains multiple automatic coordination parameters needed in the control of automatic coordination between the drive control of the pair of drive units 4 and the drive control of the pair of cameras 6. The coordination condition storage unit 41 is implemented in the auxiliary storage device 12 illustrated in FIG. 3.

The automatic coordination parameters are written in a user program by a user, and are thus stored in advance in the drive control unit 31. Automatic coordination parameters may be modified as appropriate by editing the user program using an editing tool for editing the user program. Automatic coordination parameters may also be modified directly by the hardware 21 using a function of the drive task 23d.

FIG. 6 is a diagram illustrating an example of the coordination condition table 41a according to the embodiment of the present invention. The coordination condition table 41a is a tabular list for storing and holding the automatic coordination parameters serving as coordination information for managing the automatic coordination control. The automatic coordination parameters stored in the coordination condition table 41a enables the motion monitor unit 43 to identify the motion controller 3, serving as the reference device in the coordination (coordination source), to which the automatic coordination control is to be provided; the drive unit 4 under the drive control by the motion controller 3 serving as the reference device in the coordination, to which the automatic coordination control is to be provided; and the camera 6 to which the automatic coordination control is to be provided. The motion monitor unit 43 can determine whether to provide control of the automatic coordination between the motion controller 3 and the camera 6 to which the automatic coordination control is to be provided, using the automatic coordination parameters stored in the coordination condition table 41a. The motion monitor unit 43 can also obtain information on processing other than image capturing, performed by the camera 6 to which the automatic coordination control is to be provided, using the automatic coordination parameters stored in the coordination condition table 41a. The coordination condition table 41a illustrated in FIG. 6 includes a number (No.) field 51, a flag field 52, a shaft field 53, a coordination carry-out current value field 54, a camera field 55, and a function pointer field 56.

The number (No.) field 51 contains a coordination condition identification number for identification of the type of coordination condition, i.e., the parameter set.

The flag field 52 contains flag information representing a coordination determination condition for use in determination of whether to provide the automatic coordination control. Setting of the flag information specifies a parameter set that specifies the motion controller 3 and the camera 6 whose control states are to be verified. The control state is monitored by the motion monitor unit 43 by periodically acquiring current value information. FIG. 6 uses the setting of "ON" to indicate a parameter set with which the automatic coordination control is to be provided, and uses the setting of "OFF" to indicate a parameter set with which the automatic coordination control is not to be provided.

The shaft field 53 contains shaft specification information. The shaft specification information specifies, among the shafts included in the FA system 1, the shaft connected to the drive unit 4 under the drive control by the motion controller 3 to be coordinated through the automatic coordination control. Due to one-to-one correspondence between the shaft and the drive unit 4, specification of a shaft is equivalent to specification of the drive unit 4 serving as the reference device in the coordination, and is in turn equivalent to specification of the motion controller 3 that controls that drive unit 4. In other words, the shaft specification information is motion controller specification information that specifies the motion controller 3 serving as the reference device in the coordination. Still in other words, the shaft field 53 provides identification information on the drive unit 4 serving as the reference device in the coordination.

The coordination carry-out current value field 54 contains a coordination carry-out current value. The coordination carry-out current value is a machine feed value of the drive unit 4 under the drive control by the motion controller 3 serving as the reference device in the coordination, and it serves as a predetermined decision criterion value for determination of whether to provide the automatic coordination control. The coordination carry-out current value is a machine feed value in a control complete state, where the motion controller 3 has completed the drive control of the drive unit 4. If the current machine feed value of the drive unit 4 matches the coordination carry-out current value, the automatic coordination control is performed on the camera 6 that is to be coordinated. That is, the coordination carry-out current value represents a triggering condition for performing the automatic coordination control of the camera 6 that is to be coordinated. In other words, the coordination carry-out current value is reference control state information providing the control state of the drive unit 4 at the predetermined time point when the motion monitor unit 43 is to cause the camera 6 that is to be coordinated to capture an image. Thus, the coordination carry-out current value field 54 can be said to provide the state of the drive unit 4 that provides the triggering condition for starting the process of the camera 6.

The camera field 55 contains camera specification information. The camera specification information specifies, among the cameras 6 included in the FA system 1, the camera 6 that is to be coordinated, to which the automatic coordination control is to be provided. That is, the camera field 55 can be said to provide identification information on the camera 6. If the current machine feed value of the drive unit 4 under the drive control by the motion controller 3 serving as the reference device in the coordination matches the coordination carry-out current value, the automatic coordination control is performed on the camera 6 that is to be coordinated, specified in the camera field 55.

The function pointer field 56 contains a function pointer. The function pointer is sent to the camera 6 specified as the automatically coordinated device, and is execution-processing specification information that specifies what processing is to be performed in the camera 6 to be automatically coordinated, other than image capturing by the camera 6. That is, the function pointer field 56 can be said to provide information on the processing performed by the camera 6. FIG. 6 illustrates the execution-processing specification information using a code name such as "Func1" as illustrated by way of example.

Although the coordination condition table 41a is implemented as firmware, the coordination information described above may be stored in the CPU unit 16 instead of using a tabular form.

Upon reception of the automatic coordination control start instruction information, which serves an instruction to start the automatic coordination control, from the drive control unit 31 at the beginning of the automatic coordination control, the coordination start processing unit 42 acquires the automatic coordination parameters of the parameter set with which the automatic coordination control is to be provided, i.e., the automatic coordination parameters of the parameter set having a value "ON" in the flag field 52 of the coordination condition table 41a, from the coordination condition table 41a of the coordination condition storage unit 41.

The coordination start processing unit 42 sends the automatic coordination parameters acquired from the coordination condition table 41a to the motion monitor unit 43. The automatic coordination parameters sent to the motion monitor unit 43 in this operation include the information contained in the shaft field 53, in the coordination carry-out current value field 54, in the camera field 55, and in the function pointer field 56.

The motion monitor unit 43 sends the shaft specification information, i.e., the motion controller specification information that specifies the motion controller 3 serving as the reference device in the coordination, to which the automatic coordination control is to be provided, to the motion control unit 45, on the basis of the automatic coordination parameters sent from the coordination start processing unit 42. The motion monitor unit 43 acquires periodically and at predetermined intervals, from the motion control unit 45, the actual current value information, i.e., the current machine feed value of the drive unit 4 under the drive control by the motion controller 3 serving as the reference device in the coordination, to which the automatic coordination control is to be provided.

In addition, the motion monitor unit 43 compares the actual current value information acquired from the motion control unit 45 with the coordination carry-out current value contained in the automatic coordination parameters sent from the coordination start processing unit 42. If the actual current value information matches the coordination carry-out current value, the motion monitor unit 43 sends the camera specification information and the function pointer with respect to the camera 6 that is to be coordinated, to the camera control unit 46. That is, the motion monitor unit 43 monitors the state of control that the motion controller 3 is providing to the drive unit 4, and if the control of the drive unit 4 provided by the motion controller 3 has been completed, the motion monitor unit 43 provides control of image capturing process of the camera 6 that is to be coordinated.

The motion control unit 45 acquires, periodically and at predetermined intervals, the actual current value information on the drive unit 4 under the drive control by the motion controller 3 serving as the reference device in the coordination, to which the automatic coordination control is to be provided, from the motion controller 3 serving as the reference device in the coordination. The motion control unit 45 then sends the actual current value information to the motion monitor unit 43.

Upon reception of the drive control start instruction information, which serves an instruction to start the drive control of the drive unit 4, from the drive control unit 31 at the beginning of the automatic coordination control, the motion control unit 45 sends start-up instruction information, which serves an instruction to start up that motion controller 3, to the motion controller 3 instructed to start the drive control in the drive control start instruction information. The motion controller 3 instructed to start is not limited to the motion controller 3 to which the automatic coordination control is provided, but multiple motion controllers 3 are instructed to start the drive control.

Upon reception of the camera specification information and the function pointer from the motion monitor unit 43, the camera control unit 46 provides, to the camera 6 specified in the camera specification information, control of image capturing, i.e., control of releasing the shutter, and control of performing the predetermined processing specified by the function pointer. In the present embodiment, the processing specified by the function pointer is to send the imaging data captured, to the server 7.

Figure 7:
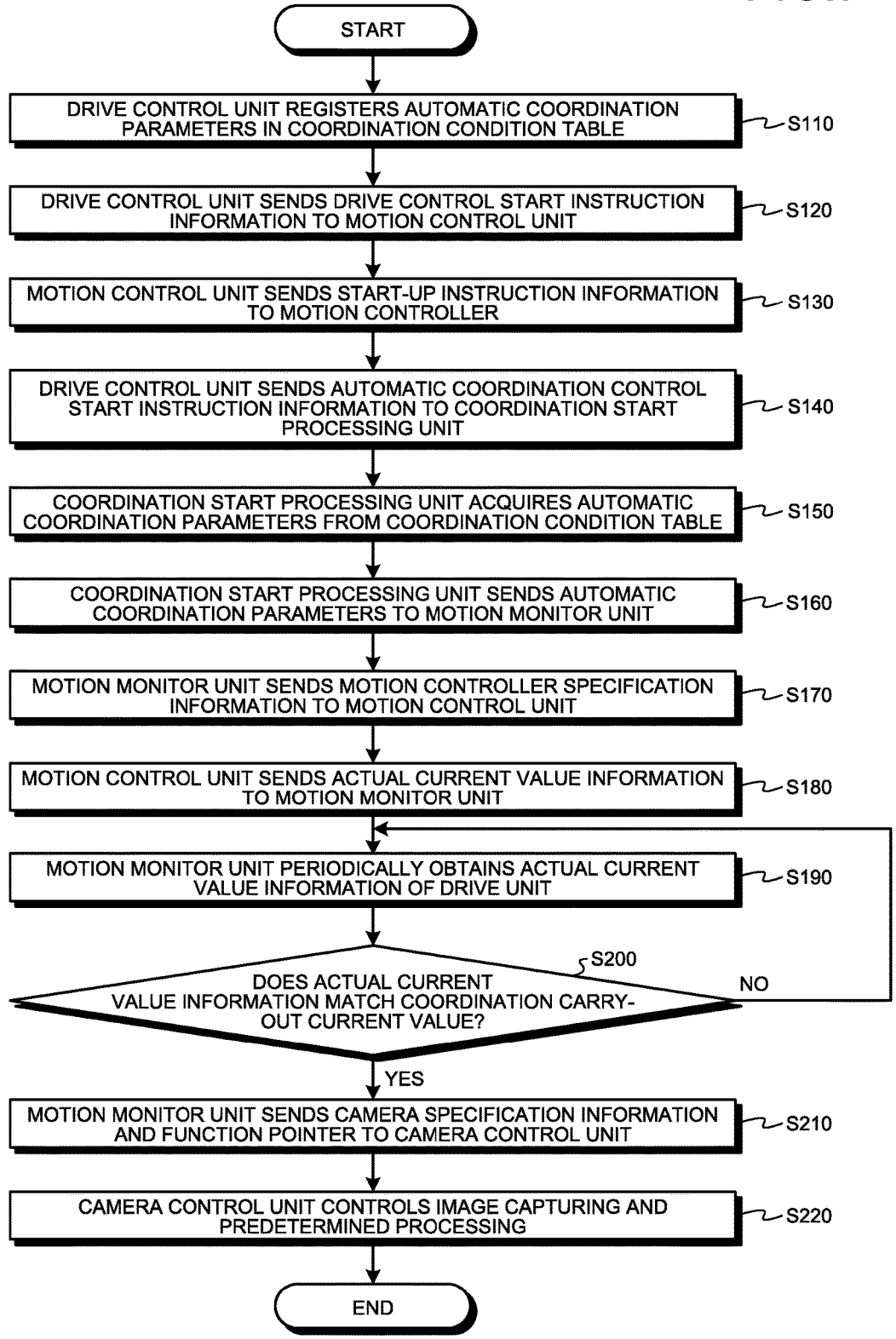
FIG. 7 is a flowchart describing a process to cause a camera to effect one cycle of image capturing in the automatic coordination control provided by the FA controller according to the embodiment of the present invention.

Automatic coordination processing performed in the FA controller 2 will next be described. FIG. 7 is a flowchart illustrating a process to cause the camera 6 to effect one cycle of image capturing in the automatic coordination control provided by the FA controller 2 according to the embodiment of the present invention.

First, at step S110, the drive control unit 31 registers automatic coordination parameters in the coordination condition table 41a before performing the control of the drive unit 4. In this step, flag information is also registered in the coordination condition table 41a.

Next, to start drive control of the drive unit 4, the drive control unit 31 sends, at step S120, drive control start instruction information, which serves an instruction to start the drive control of the drive unit 4 by the motion controller 3, to the motion control unit 45.

Upon reception of the drive control start instruction information from the drive control unit 31, the motion control unit 45 sends, at step S130, start-up instruction information to the motion controller 3 instructed to provide the drive control in the drive control start instruction information.

Next, to start automatic coordination control, the drive control unit 31 sends, at step S140, automatic coordination control start instruction information, which serves an instruction to start the automatic coordination control, to the coordination start processing unit 42.

Upon reception of the automatic coordination control start instruction information, the coordination start processing unit 42 acquires, at step S150, the automatic coordination parameters of the parameter set with which the automatic coordination control is to be initiated, from the coordination condition table 41a in the coordination condition storage unit 41. In this example, the coordination start processing unit 42 acquires the automatic coordination parameters of the parameter set having a coordination condition identification number of "No. 1", whose flag information is set to "ON", from the coordination condition table 41a in the coordination condition storage unit 41. Next, at step S160, the coordination start processing unit 42 sends the automatic coordination parameters acquired, to the motion monitor unit 43.

Next, at step S170, the motion monitor unit 43 sends, to the motion control unit 45, motion controller specification information that specifies the motion controller 3 serving as the reference device in the coordination, to which the automatic coordination control is provided, on the basis of the automatic coordination parameters, which are coordination information, sent from the coordination start processing unit 42.

Upon reception of actual current value information, i.e., current drive position information, on the drive unit 4 specified in the motion controller specification information, from the motion controller 3 specified in the motion controller specification information, the motion control unit 45 sends, at step S180, the actual current value information received, to the motion monitor unit 43. Note that the motion controller 3 sends the actual current value information periodically and at predetermined intervals. The motion control unit 45 may also request, periodically and at predetermined intervals, the actual current value information on the drive unit 4 from the motion controller 3 specified in the motion controller specification information to acquire the actual current value information.

At step S190, the motion monitor unit 43 receives and thus obtains the actual current value information sent from the motion control unit 45. This operation enables the motion monitor unit 43 to obtain periodically and at predetermined intervals and thus to monitor the actual current value information on the drive unit 4 that is to be coordinated, i.e., the state of the drive control of the drive unit 4 provided by the motion controller 3.

At step S200, the motion monitor unit 43 compares the actual current value information acquired from the motion control unit 45 with the coordination carry-out current value contained in the automatic coordination parameters sent from the coordination start processing unit 42 to determine whether the actual current value information matches the coordination carry-out current value.

If the actual current value information does not match the coordination carry-out current value, that is, No is determined at step S200, the process of the motion monitor unit 43 returns to step S190.

If the actual current value information matches the coordination carry-out current value, that is, Yes is determined at step S200, at step S210, the motion monitor unit 43 uses the determination of the match between the actual current value information and the coordination carry-out current value as a trigger and sends the camera specification information and the function pointer with respect to the camera 6 that is to be coordinated, to the camera control unit 46. That is, after determination that the state of control provided to the drive unit 4 by the motion controller 3 reaches the control state provided in the reference control state information, the motion monitor unit 43 provides control that causes the camera 6 to capture an image. In this case, the control state provided in the reference control state information is a state where the motion controller 3 has completed the control of the drive unit 4.

Upon reception of the camera specification information and the function pointer, the camera control unit 46 provides, at step S220, control of image capturing and control of performing predetermined processing specified by the function pointer, to the camera 6 specified in the camera specification information. That is, the camera control unit 46 sends, as coordination request information, the capture instruction information, which serves an instruction to capture an image, and the function pointer, to the camera 6 specified in the camera specification information. In the present embodiment, the processing specified by the function pointer is to send the imaging data captured, to the server 7. In this example, the camera control unit 46 sends the capture instruction information and the function pointer to the first camera 6A specified in the camera specification information. Thus, the automatic coordination processing of causing the camera 6 to effect one cycle of image capturing in the FA controller 2 terminates.

Note that, upon reception of the start-up instruction information sent from the motion control unit 45 at step S130 described above, the motion controller 3 sends a drive command to the drive unit 4 on the basis of the start-up instruction information to start the drive control of the drive unit 4.

After starting of the drive control of the drive unit 4, the motion controller 3 acquires, periodically and at predetermined intervals, the actual current value information, i.e., current drive position information, on the drive unit 4, from the sensor 5 of the drive unit 4. The motion controller 3 then periodically sends the actual current value information acquired, to the motion control unit 45. The actual current value information sent from the motion control unit 45 at step S180 corresponds to the actual current value information sent from the motion controller 3 to the motion control unit 45.

The camera 6 that has received the capture instruction information and the function pointer sent from the camera control unit 46 at step S220, namely, the camera 6 specified in the camera specification information, captures an image on the basis of the capture instruction information and stores the imaging data in a storage device in the camera 6, and also performs the predetermined processing specified by the function pointer on the basis of the function pointer. In this example, the first camera 6A captures an image and stores the imaging data in the first server 7A.

As described above, the FA system 1 uses a determination of the match between the actual current value information used in control of the drive unit 4 and the coordination carry-out current value as a trigger to determine that the state of control provided to the drive unit 4 by the motion controller 3 reaches the control state provided in reference control state information, thus to provide control to cause the camera 6 to capture an image. That is, use of simple automatic coordination parameters stored in the coordination condition table 41a enables the FA system 1 to provide automatic coordination control without using a dedicated sensor for activation of the camera 6. Thus, the FA system 1 is a control system that automatically coordinates a first device, i.e., the drive unit 4, and a second device, i.e., the camera 6. Therefore, the FA system 1 can provide automatic coordination control by using a relatively simple configuration. The FA system 1 can also provide cost reduction. Moreover, because it is not necessary to provide a space to dispose a dedicated sensor for activation of the camera 6, the FA system 1 can have a smaller footprint size, and in addition, there will no longer be a reduction in operational efficiency due to malfunction of the dedicated sensor.

If the above determination at step S200 results in Yes, that is, if the actual current value information matches the coordination carry-out current value, the motion monitor unit 43 performs step S210 basically immediately after the determination at step S200. The drive support task 24*d* is a system task, which has a higher processing priority than a user task. Accordingly, unless any task that is a system task having a higher priority than the drive support task 24*d* is enqueued, the computing unit 10 can perform step S210 immediately after the determination at step S200 as a process of the motion monitor unit 43.

Performing of the above process enables the coordination support system 44 to check, periodically and at predetermined intervals, for the time when the actual current value information matches the coordination carry-out current value, that is, for the time when the operation of the drive unit 4 is completed, to promptly perform control processing on the camera 6 as soon as the operation of the drive unit 4 is completed.

The coordination support system 44 can perform processing of the automatic coordination control as a system task. This enables automatic coordination to be provided quickly between the drive control of the drive unit 4 by the motion controller 3 and the control that causes the camera 6 to capture an image, thereby enabling a reduction in temporal delay in the automatic coordination control, that is, a reduction in processing latency.

In the coordination support system 44, the automatic coordination parameters are held in the coordination condition table 41*a*; therefore, multiple different automatic coordination controls can be set for the multiple motion controllers 3 and the multiple cameras 6. That is, by setting the flag information to "ON" for multiple different parameter sets in the coordination condition table 41*a*, automatic coordination control can be provided to multiple different combinations of the motion controllers 3 and the cameras 6. With respect to the multiple motion controllers 3 and cameras 6, this can provide high flexibility in the combinations of the motion controllers 3 and the cameras 6 in providing the automatic coordination control by using relatively simple automatic coordination parameters stored in the coordination condition table 41*a*.

The camera coordination apparatus 40 can set whether to provide automatic coordination control using relatively simple automatic coordination parameters.

The automatic coordination parameters in the coordination condition table 41*a* can be registered and changed from the drive control unit 31 of the drive task 23*d* performed in the FA controller 2. This configuration allows a coordination condition required for the automatic coordination control to be easily configured.

The user needs only to describe, in the user program, a procedure to write the automatic coordination parameters into the coordination condition table 41*a*, and does not need to describe, in the user program, the control operation itself for coordinating the drive control of the drive unit 4 provided by the motion controller 3 and the control that causes the camera 6 to capture an image.

The foregoing has been described assuming that, if the actual current value information matches the coordination carry-out current value, the motion monitor unit 43 sends the camera specification information and the function pointer to the camera control unit 46. However, the motion monitor unit 43 may send only the camera specification information to the camera control unit 46. In such case, the camera control unit 46 will identify the camera 6 specified in the camera specification information and the server 7 to which imaging data is to be sent from that camera 6, and notify the camera 6. The camera control unit 46 will receive, from the drive control unit 31, destination server information on the server 7 to which each of the cameras 6 is to send imaging data, at the beginning of the automatic coordination control, and then store the destination server information. Note, however, that it is preferable that the motion monitor unit 43 send both the camera specification information and the function pointer to the camera control unit 46 in view of reduction in processing load of the camera control unit 46.

The foregoing has been described assuming that the coordination carry-out current value is a machine feed value in the operation complete state where the drive unit 4 has completed an operation, i.e., the control complete state of the drive control of the drive unit 4 provided by the motion controller 3. However, the coordination carry-out current value is not limited thereto. The coordination carry-out current value may also be a machine feed value of the drive unit 4 during an operation of the drive unit 4, i.e., during the drive control of the drive unit 4 provided by the motion controller 3. In this case, the control state provided in the reference control state information will be a state during the control of the drive unit 4 provided by the motion controller 3.

The coordination carry-out current value may also be determined such that the time point when the control by the motion controller 3 is completed is previously estimated; the time period from the determination process in the motion monitor unit 43 until the camera 6 actually captures an image is previously estimated; and the machine feed value during an operation of the drive unit 4 at the time ahead by the above time period is calculated as the coordination carry-out current value. In this case, the camera 6 can capture an image at the time when the operation complete state is reached, i.e., when the operation of the drive unit 4 is completed.

If the system part in which the automatic coordination control is performed on the motion controller 3 and the camera 6 is a system part directly involved in a production operation of a product, such as a part assembly process, instead of a system part involved in feeding of a product, the time point of reaching the operation complete state is estimated and the machine feed value during an operation of the drive unit 4 is set as the coordination carry-out current value, thereby enabling the time point to send the capture instruction information to the camera 6 to advance and allowing the camera 6 to capture an image at the time point when the operation of the drive unit 4 is completed. This can reduce or eliminate the time required for the drive unit 4 to stop for allowing the camera 6 to capture an image as compared to when the capture instruction information is sent to the camera 6 after completion of the operation of the drive unit 4. This increases the availability of the drive unit 4 and thus improves the productivity of the FA system 1.

If the system part in which the automatic coordination control is performed on the motion controller 3 and the camera 6 is a system directly involved in a production operation of a product, such as a part assembly process, instead of a system involved in feeding of a product, the machine feed value during an operation of the drive unit 4 is set as the coordination carry-out current value irrespective of the time point of reaching the operation complete state, thereby enabling the camera 6 to capture an image of the operational state during an operation of the drive unit 4 and thus enabling such operation of the drive unit 4 to be verified.

The FA controller 2 may also be configured to acquire, from the motion controller 3, information on a target drive position, which is an intended drive position, of the drive unit 4 for use in control of the drive unit 4 provided by the motion controller 3, and to calculate the drive command using the target drive position. The FA controller 2 may also operate to previously estimate the time point when the drive unit 4 will reach the target drive position, using the target drive position. In this case, the FA controller 2 can provide control that causes the camera 6 to capture an image at the time point estimated.

The foregoing has been described assuming that the coordination condition table 41a contains one coordination carry-out current value field 54. However, the coordination condition table 41a may contain two coordination carry-out current value fields 54. That is, two coordination carry-out current values may be set per parameter set. Containing two coordination carry-out current values in the coordination condition table 41a enables automatic coordination control to have higher flexibility with respect to the time point of image capturing by the camera.

FIG. 8 is a diagram illustrating an example of another coordination condition table 41b according to the embodiment of the present invention. The coordination condition table 41b differs from the coordination condition table 41a in that the coordination condition table 41b contains a first coordination carry-out current value field 57 and a second coordination carry-out current value field 58 in place of the coordination carry-out current value field 54. The first coordination carry-out current value field 57 and the second coordination carry-out current value field 58 contain coordination carry-out current values different from each other. Use of the first coordination carry-out current value field 57 and the second coordination carry-out current value field 58 enables the motion monitor unit 43 to perform the automatic coordination control such that, for example, image capturing by the camera is started at the time point when the coordination carry-out current value stored in the first coordination carry-out current value field 57 matches the actual current value information, and image capturing by the camera is terminated at the time point when the coordination carry-out current value stored in the second coordination carry-out current value field 58 matches the actual current value information.

Moreover, use of the first coordination carry-out current value field 57 and the second coordination carry-out current value field 58 enables the motion monitor unit 43 to perform the automatic coordination control such that, for example, first image capturing is performed by the camera at the time point when the coordination carry-out current value stored in the first coordination carry-out current value field 57 matches the actual current value information, and second image capturing is performed by the camera at the time point when the coordination carry-out current value stored in the second coordination carry-out current value field 58 matches the actual current value information. In this example, the time point of the first image capturing by the camera is a time point during the control of the drive unit 4 provided by the motion controller 3, and the time point of the second image capturing by the camera is the time point when the motion controller 3 completes the control of the drive unit 4.

The foregoing has been described in terms of an example in which the drive unit 4 drives a belt conveyor, but the element driven by the drive unit 4 is not limited to a belt conveyor. Other examples include apparatuses such as a robot controllable by the FA controller 2 in the production system.

The foregoing has been described assuming that the computing unit 10 uses a single core CPU, but the computing unit 10 may use a dual core CPU.

As described above, the FA controller 2 according to the present embodiment provides an advantage in that the control of the drive unit 4 by the motion controller 3 and the control of image capturing of the camera 6 can be promptly coordinated.

The configurations described in the foregoing embodiment are merely examples of various aspects of the present invention. These configurations may be combined with a known other technology, and moreover, part of such configurations may be omitted and/or modified without departing from the spirit of the present invention.

REFERENCE SIGNS LIST 1 factory automation system; 2 factory automation controller; 3 motion controller; 3A first motion controller; 3B second motion controller; 4 drive unit; 4A first drive unit; 4B second drive unit; 5 sensor; 5A first sensor; 5B second sensor; 6 camera; 6A first camera; 6B second camera; 7 server; 7A first server; 7B second server; 10 computing unit; 11 main storage device; 12 auxiliary storage device; 13 input-output unit; 14 control program; 15 bus; 16 central-processing-unit unit; 21 hardware; 22 OS; 23a, 23b, 23c user task; 23d drive task; 24a, 24b, 24c system task; 24d drive support task; 31 drive control unit; 40 camera coordination apparatus; 41 coordination condition storage unit; 41a, 41b coordination condition table; 42 coordination start processing unit 43 motion monitor unit; 44 coordination support system; 45 motion control unit 46 camera control unit; 51 number (No.) field; 52 flag field; 53 shaft field; 54 coordination carry-out current value field; 55 camera field; 56 function pointer field; 57 first coordination carry-out current value field; 58 second coordination carry-out current value field; 61A first belt conveyor; 61B second belt conveyor; 62A first conveyor belt; 62B second conveyor belt; 63A first roller; 63B second roller; 64A first roller shaft; 64B second roller shaft; 65 product.

The invention claimed is:

1. An imaging-device coordination apparatus that provides automatic coordination control that causes an imaging device to capture an image at a predetermined time point during control of a control target device by a motion controller, the imaging-device coordination apparatus comprising:
 a coordination condition memory to store a coordination condition specifying the motion controller and the imaging device to which the automatic coordination control is to be provided; and
 coordination circuitry that causes the imaging device stored in the coordination condition memory to capture an image, at the predetermined time point of causing the imaging device stored in the coordination condition memory to capture an image in a state where the motion controller completes the control of the control target device or in a state during the control of the control target device provided by the motion controller, on a basis of a control state of the control target device, wherein the control state indicates a progress of an operation of the control target device caused by the motion controller stored in the coordination condition memory.

2. The imaging-device coordination apparatus according to claim 1, wherein
the coordination condition memory contains reference control state information providing a control state of the control target device at the predetermined time point, and
the coordination circuitry provides the control that causes the imaging device to capture an image after determining that the control state of the control target device provided by the motion controller reaches the control state provided in the reference control state information.

3. The imaging-device coordination apparatus according to claim 2, wherein
the control state provided in the reference control state information is a state where the motion controller completes the control of the control target device.

4. The imaging-device coordination apparatus according to claim 2, wherein
the control state provided in the reference control state information is a state during the control of the control target device provided by the motion controller.

5. The imaging-device coordination apparatus according to claim 1, wherein
the coordination condition memory is capable of storing a plurality of combinations of the motion controller and the imaging device to which the automatic coordination control is to be provided, and stores coordination determination condition for use in determination of whether to provide the automatic coordination control with respect to the combinations, and
the coordination circuitry determines the combination to which the automatic coordination control is to be provided, on a basis of the coordination determination condition.

6. The imaging-device coordination apparatus according to claim 1, wherein
the coordination condition memory stores execution-processing specification information specifying what processing is to be performed in the imaging device to which the automatic coordination control is to be provided, the processing being other than image capturing, and
the coordination circuitry sends the execution-processing specification information to the imaging device.

7. A non-transitory computer-readable medium including an imaging-device coordination program to provide automatic coordination control that causes an imaging device to capture an image at a predetermined time point during control of a control target device by a motion controller, the imaging-device coordination program causing a computer to perform:
acquiring, from a memory a coordination condition specifying the motion controller and the imaging device to which the automatic coordination control is to be provided, and of providing control that causes the imaging device specified by the coordination condition to capture an image, at the predetermined time point of causing the imaging device specified by the coordination condition to capture an image in a state where the motion controller completes the control of the control target device or in a state during the control of the control target device provided by the motion controller, on a basis of a control state of the control target device, wherein the control state indicates a progress of an operation of the control target device caused by the motion controller specified by the coordination condition.

8. The non-transitory computer-readable medium according to claim 7, wherein the imaging-device coordination program causes a computer to perform:
if the memory stores reference control state information providing a control state of the control target device at the predetermined time point, providing control that causes the imaging device to capture an image after determining that the control state of the control target device provided by the motion controller reaches the control state provided in the reference control state information.

9. The non-transitory computer-readable medium according to claim 8, wherein
the control state provided in the reference control state information is a state where the motion controller completes the control of the control target device.

10. The non-transitory computer-readable medium according to claim 8, wherein
the control state provided in the reference control state information is a state during the control of the control target device provided by the motion controller.

11. A coordination support system that provides, in a control device including a memory, automatic coordination control that causes an imaging device to capture an image at a predetermined time point during control of a control target device by a motion controller, the coordination support system comprising:
coordination start circuitry to acquire, from the memory, a coordination condition specifying the motion controller and the imaging device to which the automatic coordination control is to be provided; and
motion monitor circuitry to provide control that causes the imaging device specified by the coordination condition to capture an image, at the predetermined time point of causing the imaging device specified by the coordination condition to capture an image in a state where the motion controller completes the control of the control target device or in a state during the control of the control target device provided by the motion controller, on a basis of a control state of the control target device, wherein the control state indicates a progress of an operation of the control target device caused by the motion controller specified by the coordination condition.

12. The coordination support system according to claim 11, wherein
the coordination start circuitry acquires, from the memory, reference control state information providing a control state of the control target device at the predetermined time point, and
the motion monitor circuitry provides control that causes the imaging device to capture an image after determining that the control state of the control target device provided by the motion controller reaches the control state provided in the reference control state information.

13. The coordination support system according to claim 12, wherein
the control state provided in the reference control state information is a state where the motion controller completes the control of the control target device.

14. The coordination support system according to claim 12, wherein the control state provided in the reference control state information is a state during the control of the control target device provided by the motion controller.

15. A control system comprising:

control circuitry to control a motion controller and an imaging device;

the motion controller to control a control target device as controlled by the control circuitry; and the imaging device to capture an image as controlled by the control circuitry, wherein the control circuitry includes imaging-device coordination circuitry that provides automatic coordination control that causes the imaging device to capture an image at a predetermined time point during control of the control target device by the motion controller, and the imaging-device coordination circuitry includes a coordination condition memory to store a coordination condition specifying the motion controller and the imaging device to which the automatic coordination control is to be provided, and coordination circuitry that causes the imaging device stored in the coordination condition memory to capture an image, at the predetermined time point of causing the imaging device stored in the coordination condition memory to capture an image in a state where the motion controller completes the control of the control target device or in a state during the control of the control target circuitry provided by the motion controller, on a basis of a control state of the control target device, wherein the control state indicates a progress of an operation of the control target device caused by the motion controller stored in the coordination condition memory.

\* \* \* \* \*